US007747676B1

(12) United States Patent
Nayfeh et al.

(10) Patent No.: US 7,747,676 B1
(45) Date of Patent: Jun. 29, 2010

(54) SELECTING AN ADVERTISING MESSAGE FOR PRESENTATION ON A PAGE OF A PUBLISHER WEB SITE BASED UPON BOTH USER HISTORY AND PAGE CONTEXT

(75) Inventors: Basem Nayfeh, Mercer Island, WA (US); Andrew Chen, Seattle, WA (US)

(73) Assignee: AudienceScience Inc., Bellevue, WA (US)

( * ) Notice: Subject to any disclaimer, the term of this patent is extended or adjusted under 35 U.S.C. 154(b) by 1376 days.

(21) Appl. No.: 11/087,378

(22) Filed: Mar. 22, 2005

Related U.S. Application Data

(60) Provisional application No. 60/637,681, filed on Dec. 20, 2004.

(51) Int. Cl.
*G06F 15/16* (2006.01)
(52) U.S. Cl. .................. 709/203; 709/202; 709/217; 709/229; 709/246
(58) Field of Classification Search .............. 709/201, 709/219, 229, 246, 202, 203, 217
See application file for complete search history.

(56) References Cited

U.S. PATENT DOCUMENTS 7,065,550 B2 * 6/2006 Raghunandan .............. 709/203

2003/0041159 A1 * 2/2003 Tinsley et al. ............... 709/231
2005/0131992 A1 * 6/2005 Goldstein et al. ........... 709/202

* cited by examiner

*Primary Examiner*—Michael Won
(74) *Attorney, Agent, or Firm*—Perkins Coie LLP

(57) ABSTRACT

A facility for selecting an advertising message to present to a user via a selected device in connection with a selected instance of electronic content presented via the device is described. For the selected instance of electronic content, as well as any other instances of electronic content that were previously presented via the selected device during an immediately preceding period of time of preselected length, the facility distinguishes any subjects identified as corresponding to the instance of electronic content. Among a number of advertising messages, the facility distinguishes advertising messages identified as corresponding to any of the distinguished subjects. The facility weights each of the distinguished advertising messages based upon its expected level of performance, and randomly selects one of the distinguished advertising messages in accordance with their weights for presentation in connection with the selected instance of electronic content via the selected device.

20 Claims, 7 Drawing Sheets

| page | keywords |
|---|---|
| http://www.xyz.com | |
| http://www.xyz.com/sports/tennis | racket, athlete |
| http://www.xyz.com/business/ipos | ipo, capital_market |
| http://www.xyz.com/entertainment/movies | films |

*FIG. 2* browsing history table — 400

| time | page |
|---|---|
| 12/1/04 5:12:03p | http://www.xyz.com/entertainment/movies |

— 401
— 411    — 412

*FIG. 4* keyword history table — 500

| time | keyword |
|---|---|
| 12/1/04 5:12:03p | films |

— 501
— 511    — 512

*FIG. 5* ad table — 600

| ad | keywords | performance score |
|---|---|---|
| 10623 | racket | 0.853 |
| 10985 | racket, athlete | 0.002 |
| 11520 | athlete | 0.217 |
| 12894 | films | 0.756 |
| 15641 | ipo | 0.451 |
| 17894 | capital_market, ipo | 0.013 |
| 17895 | films | 0.678 |

— 601
— 602
— 603
— 604
— 605
— 606
— 607

— 611    — 612    — 613

*FIG. 6* ad selection table — 700

| ad | weighting value |
|---|---|
| 12894 | 0.756 |
| 17895 | 0.678 |

711 — 712
701
702

*FIG. 7* browsing history table — 800

| time | page |
|---|---|
| 12/1/04 5:12:03p | http://www.xyz.com/entertainment/movies |
| 12/1/04 5:13:24p | http://www.xyz.com/sports/tennis |

811 — 812
801
802

*FIG. 8* keyword history table — 900

| time | keyword |
|---|---|
| 12/1/04 5:12:03p | films |
| 12/1/04 5:13:24p | racket |
| 12/1/04 5:13:24p | athlete |

911 — 912
901
902
903

*FIG. 9* ad selection table ─1000

| ad | weighting value |
|---|---|
| 12894 | 0.756 |
| 17895 | 0.678 |
| 10623 | 0.853 |
| 10985 | 0.002 |
| 11520 | 0.217 |

─1001
─1002
─1003
─1004
─1005
─1011  ─1012

*FIG. 10* keyword performance table ─1100

| keyword | performance score |
|---|---|
| racket | 0.783 |
| athlete | 0.206 |
| films | 0.726 |
| ipo | 0.421 |
| capital_market | 0.011 |

─1101
─1102
─1103
─1104
─1105
─1111  ─1112

*FIG. 11* keyword selection table ─1200

| keyword | weighting value |
|---|---|
| racket | 0.783 |
| athlete | 0.206 |
| films | 0.726 |

SELECTING AN ADVERTISING MESSAGE FOR PRESENTATION ON A PAGE OF A PUBLISHER WEB SITE BASED UPON BOTH USER HISTORY AND PAGE CONTEXT

CROSS-REFERENCE TO RELATED APPLICATION(S)

This application claims the benefit of U.S. Provisional Patent Application No. 60/637,681, filed on Dec. 20, 2004, which is hereby incorporated by reference in its entirety.

TECHNICAL FIELD

The described technology is directed to the field of electronic advertising.

BACKGROUND

Many web sites rely on revenue from Internet advertising to provide financial support for their operation. Such web sites, sometimes referred to as "publisher sites" or "publishers," typically include one or more paid advertising messages in each web page they serve to a user visiting the publisher site. Such inclusion is often referred to as "presenting" an advertising message to the user requesting (i.e., "visiting") the page.

Typically, a user may click on or otherwise select such ads to navigate to a different web page providing more information about the advertiser or the specific subject of the advertising message. While publishers use a variety of different pricing models for such advertising, under many of these pricing models, an advertiser only pays a publisher for inclusions of its advertising message that are selected by the users to whom they are presented, or for inclusions that users select and then perform some subsequent action, such as purchasing a product.

Publishers have an incentive to maximize the extent to which the advertising messages presented to each user are relevant to that user. First, the greater extent to which the advertising messages presented to a particular user are relevant to that user, the more revenue the publisher can expect to derive from presenting advertising messages to the user. Second, users that receive advertising messages that they find relevant are less likely to feel bombarded by information that they find unhelpful.

Publishers typically use one of two different conventional approaches to selecting advertising messages for presentation to users. In a first conventional approach, the publisher analyzes the contents of each page of the publisher web site to identify any subjects to which the page relates. The publisher then uses correspondences between advertising messages and subjects to select advertising messages corresponding to select, for all users visiting a particular page, advertising messages that correspond to the subjects to which the page is identified as relating. While in many cases it can be productive to include on a page advertising messages relating to the page's subject, the first conventional approach has the disadvantage that publisher sites often have several pages that don't have a subject, such as a home page and a terms of use page—many of them receiving significant user traffic—for which the first approach is unable to select a relevant advertising message. Further, in some cases in which the page does have a discernable subject, an advertising message targeted to a user determined to have a certain interest that is different from that subject may be more successful than an advertising message relating to the page.

In a second conventional approach, the publisher monitors each user's behavior on the publisher site, such as the set of pages of the publisher site the user visits. This user behavior information is used once each day to assign each user to a group of users, or "segment," thought to all share a common interest. In the second conventional approach, the publisher selects advertising messages for presentation to a user based upon the segment of which the user is a member, without regard for the identity or subject of the page on which the advertising message is presented. The second conventional approach has the disadvantage that, until a user accumulates a history at the publisher site and is assigned to a segment, there is no useful basis for selecting advertising messages that user. Further, segment assignment may in some cases be erroneous, rendering advertising messages selected based on segment membership less effective. Also, in some cases in which the user has been correctly assigned to a segment, an advertising message selected based upon the subject of the page may be more effective than an advertising message assigned based upon the user's segment.

In view of the foregoing, an approach to selecting advertising messages for presentation that overcame some or all of the shortcomings of the above-described conventional approaches would have significant utility.

BRIEF DESCRIPTION OF THE DRAWINGS

FIG. 2 is a table diagram showing a sample page analysis table typically used by the facility.

FIG. 4 is a table diagram showing a sample browsing history table typically used by the facility to identify pages of the publisher site recently visited by the user.

FIG. 5 is a table diagram showing a keyword history table typically used by the facility.

FIG. 6 is a table diagram showing a sample ad table from which the sample typically collects advertising messages.

FIG. 7 is a table diagram showing an ad selection table typically used by the facility to store a weighting value for each collected ad.

FIG. 8 shows an updated browsing history table.

FIG. 9 is a table diagram showing an updated sample keyword history table.

FIG. 10 is a table diagram showing an updated sample ad selection table.

FIG. 11 is a table diagram showing a sample keyword performance table typically used by the facility.

FIG. 12 is a table diagram showing a sample keyword selection table typically used by the facility.

DETAILED DESCRIPTION

Figure 1:
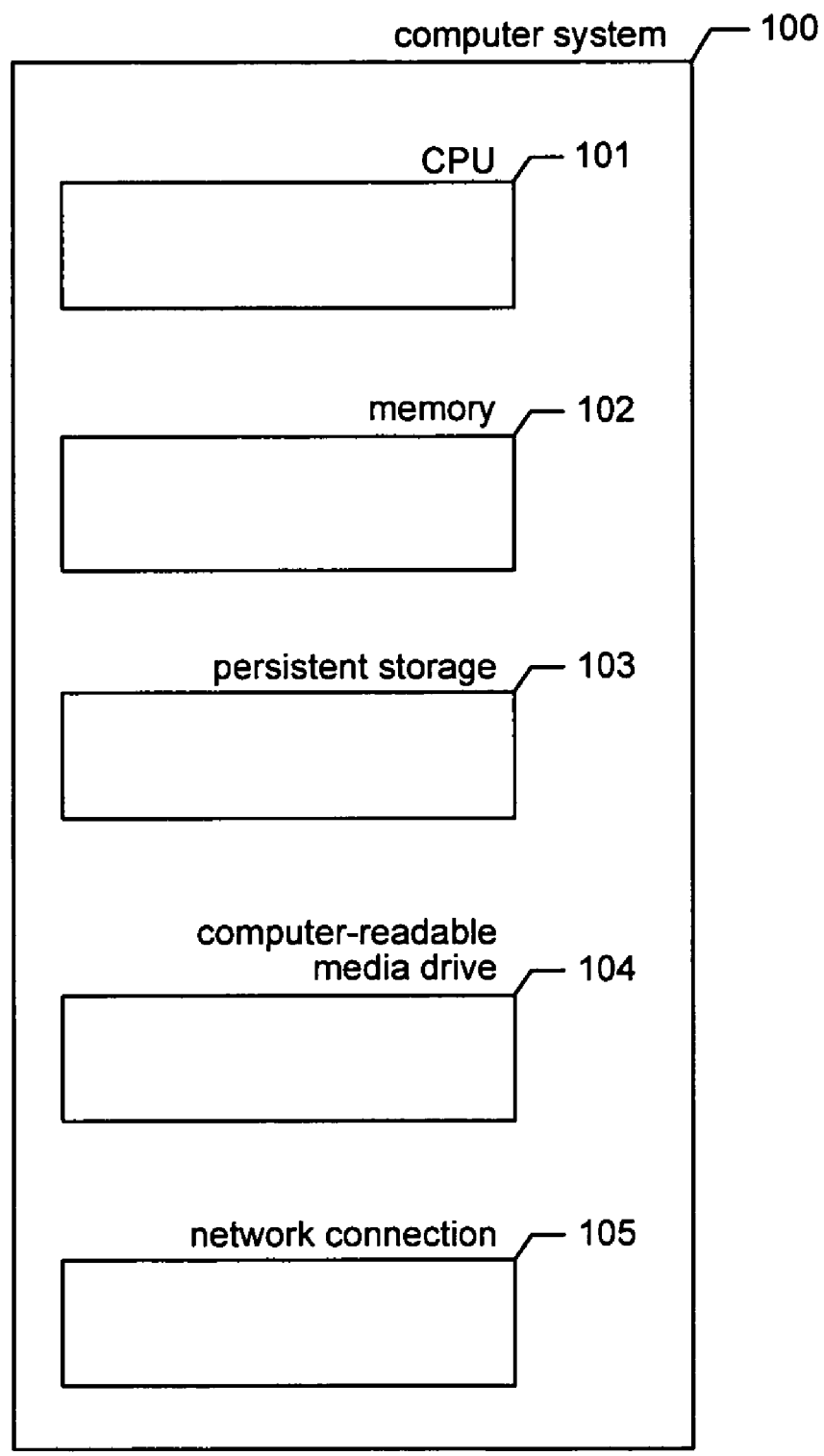
FIG. 1 is a block diagram showing some of the components typically incorporated in at least some of the computer systems and other devices on which the facility executes.

A software and/or hardware facility used by or on behalf of a publisher to select advertising messages for presentation on pages of the publisher web site based upon both user history and page context ("the facility") is described. In some embodiments, the facility maintains for each user a list of pages on the publisher site recently visited, including any page that has been requested by the user but not yet returned to the user. For every page of the web site, the publisher identifies any keywords that tend to describe the subject of the page. For each of the advertising messages accepted by the publisher from an advertiser, the advertiser or the publisher identifies any keywords that tend to describe the subject of the advertising message. The advertiser further maintains a performance score for each advertising message indicating the extent to which the advertising message has generated revenue when previously presented.

When the publisher receives a request for a page of the publisher site from a user, the facility accesses the list of pages on the publisher site recently visited by the user, including the requested page. For example, if the user previously visited a movies page and is presently requesting a tennis page, the list includes both the movies page and the tennis page. The facility unions the keywords identified for any of the pages recently visited by the user, and collects the advertising messages for which at least one of the unioned keywords is identified. In the above example, if the keywords "racket" and "athlete" are identified for the tennis page and the keyword "films" is identified for the movies page, the facility collects any advertising messages for which any of those three keywords is identified. The facility then weights each of the collected advertising messages in accordance with its performance score, and randomly selects one or more of the collected advertising messages based on the ratings. For example, in some embodiments, if the collection included a first advertising message and a second advertising message that had a performance score three times as large as the performance score of the first advertising message, the second advertising message would be three times as likely as the first advertising message to be selected. The facility returns a version of the requested page that includes the selected advertising message. The facility uses the requesting user's behavior in response to the selected advertising message to update the performance score for that advertising messages.

In some embodiments, rather than weighting the collected advertising messages directly based upon their performance scores, the facility instead bases these weightings on a function of the performance scores capable of emphasizing or deemphasizing differences between the scores, such as exponentiation.

In some embodiments, rather than tracking the performance of individual advertising messages and using such tracking data to select individual advertising messages as described above, the facility instead tracks the performance of keywords and uses such tracking data to select a keyword that can be subsequently used to select a particular advertising message. For example, the one of the advertising messages for which the selected keyword is identified whose volume level commitment the publisher is furthest from satisfying may be selected.

In some embodiments, before adding keywords to a user's profile, the facility filters such keywords to include only those that are the subject of an active bid. As a result, the facility increases the likelihood that a targeted advertising message can be presented to a user when any of the keywords in his or her profile is selected.

In some embodiments, the facility permits a publisher to submit text containing keywords or potentially containing keywords in two different forms: the publisher can submit text either as raw text or as qualified text. A publisher submits text as raw text in cases where the publisher is uncertain whether the text is composed exclusively of keywords likely to be useful, and submits text as qualified text when it determines that the text contains only keywords likely to be useful. Before using the contents of raw text, the facility filters the raw text to extract only terms likely to constitute useful keywords. In some embodiments, the facility performs this filtering by matching the raw text with a set of preselected keywords, such as keywords each corresponding to a proper noun or other particular thing. A publisher may use the opportunity to submit text as raw text to submit arbitrary text associated with the user. For example, a publisher of a social networking web site that permits its users to create and modify personal pages containing personal details about each user may submit to the facility certain text entered by the user into his or her personal page—such as the contents of a "user interests" field—as raw text. As a result, the text entered into this field by a user is filtered by the facility to extract keywords likely to be useful. As another example, a publisher of a web site that permits its users to search for pages of the web site containing keywords typed by a user into a search box displayed on the web site may submit to the facility text entered by the user into this search box as raw text.

In some embodiments, the facility selects advertising messages for presentation in environments other than web pages. As one example, some embodiments of the facility select advertising messages for presentation in connection with a media sequence, such as an audio sequence or video sequence.

By selecting advertising messages and/or keywords that are in turn used to select advertising messages in some or all of the ways discussed above, embodiments of the facility are able to take advantage of both page context and user history to select advertising messages likely to be relevant to the user, and therefore likely to be the most interesting to the user, the most remunerative to the publisher, and/or the most effective for the advertiser. Further, by taking advantage of feedback in performance scores, the facility is able to adapt to trends in user interests, in some cases in a short period of time.

FIG. 1 is a block diagram showing some of the components typically incorporated in at least some of the computer systems and other devices on which the facility executes. These computer systems and devices 100 may include one or more central processing units ("CPUs") 101 for executing computer programs; a computer memory 102 for storing programs and data—including data structures—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. While computer systems configured as described above are typically used to support the operation of the facility, one of ordinary skill in the art will appreciate that the facility may be implemented using devices of various types and configurations, and having various components.

While various embodiments are described in terms of the environment described above, those skilled in the art will appreciate that the facility may be implemented in a variety of other environments including a single, monolithic computer system, as well as various other combinations of computer systems or similar devices connected in various ways.

FIG. 2 is a table diagram showing a sample page analysis table typically used by the facility. The table 200 identifies for each of a number of pages of the publisher web site one or more keywords that indicate the subject of the page. Each row of the table, such as rows 201-204, corresponds to a different page of the publisher web site. Each row is divided into a page column 211, identifying the page, such as by its URL or a fragment thereof, and a keywords column 212, containing any keywords attributed to the page. For example, row 204 indicates that the page http://www.xyz.com/entertainment/movies ("the movies page") relates to the keyword "films." The keywords in column 212 may be provided in a variety of ways, such as by human review and analysis of the page, or automated techniques such as statistical linguistic analysis or natural language understanding. The same page analysis table is typically used for all of the users that visit the publisher web site.

While FIG. 2 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc. In addition, contents of table diagrams may variously be stored by or in connection with the web server for the publisher web site or a separate server controlled by separate entity, or may be encoded in cookies stored locally on user computer systems.

Figure 3:
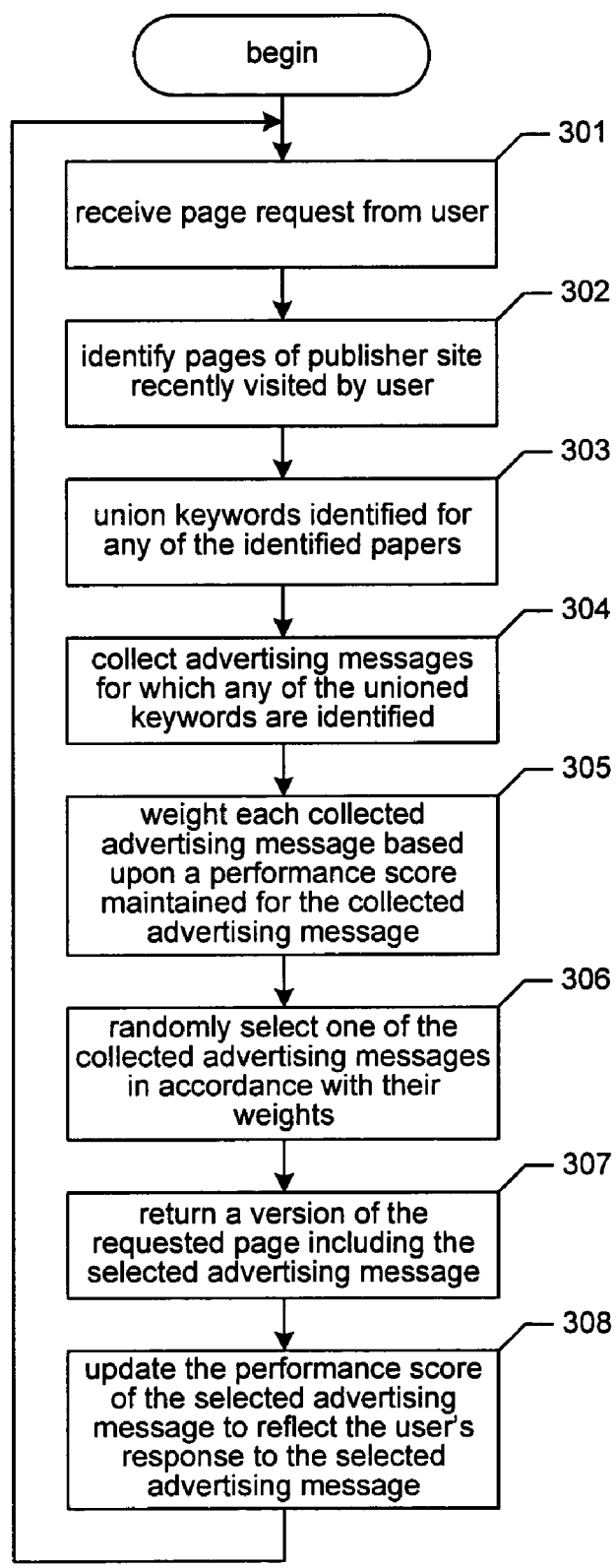
FIG. 3 is a flow diagram showing steps typically performed by the facility in order to respond to page requests for the publisher site with pages containing an advertising message selected by the facility.

FIG. 3 is a flow diagram showing steps typically performed by the facility in order to respond to page requests for the publisher site with pages containing an advertising message selected by the facility. In step 301, the facility receives a page request from an identified user. In step 302, the facility identifies pages of the publisher web site recently visited by the user. The pages identified in step 302 typically include the page for which the page request was received in step 301, irrespective of whether an earlier request for the same page was received from this user.

FIG. 4 is a table diagram showing a sample browsing history table typically used by the facility to identify pages of the publisher site recently visited by the user. The facility typically maintains a separate copy of the browsing history table 400 for each user that has visited the publisher site. The browsing history table is made up of rows, such as row 401, each corresponding to a page of the publisher site that the user has visited. Each row is divided into a time column 411 indicating the time at which the page was visited and a page column 412 identifying the page, such as by containing its URL or a fragment thereof. For example, row 401 indicates that the user to whom the browsing history table corresponds visited the movies page at 5:12:03 pm on Dec. 1, 2004. The time column contents may be used to expire rows of the browsing history table that reflect browsing more than a configurable length of time ago, such as an hour, a day, a week, or a month. In some embodiments, the facility accomplishes such expiration by removing rows from the browsing history table whose times are too early to be within the period under consideration. In other embodiments, rather than removing rows from the browsing history table, the facility merely identifies only the pages whose rows have a time late enough to be in the period under consideration.

Returning to FIG. 3, in step 303, the facility unions the keywords identified for any of the pages identified in step 302. Step 303 typically involves combining the keywords listed in the page analysis table for all of the pages identified in the browsing history table. For example, in view of the contents of browsing history table 400, the facility unions only the keyword contained in the keywords column of row 204 of the page analysis table, "films."

FIG. 5 is a table diagram showing a keyword history table used by some embodiments of the facility in place of the browsing history table. The table 500 is made up of rows, such as row 501, each corresponding to a different keyword and indicating the most recent time that the user requested a page to which the keyword is attributed. Each row is divided into a time column 511 containing the time and a keyword column 512 containing the keyword. For example, row 501 indicates that user requested a page to which the keyword "films" is attributed at 5:12:03 pm on Dec. 1, 2004.

Returning to FIG. 3, in step 304, the facility collects advertising messages for which any of the unioned keywords are identified.

FIG. 6 is a table diagram showing a sample ad table from which the sample typically collects advertising messages in step 304. The ad table 600 is comprised of rows, such as rows 601-607, each corresponding to a different advertising message (or "ad"). The publisher may receive such ads from advertisers in a variety of ways, and may make a variety of different arrangements for charging for, billing for, and collecting for the presentation of such ads. Each row is divided into an ad column 611 containing information identifying the ad, such as a numerical ad ID; a keywords column 612 listing any keywords attributed to the ad; and a performance score column 613 containing a numerical performance score indicating how the ad has performed in the past and/or is expected to perform in the future. For example, row 604 indicates that ad 12894 is related to the keyword "films," and has a performance score of 0.756. The keywords in the keywords column may be determined in a variety of ways, either by the advertiser submitting the ad or the publisher, and either based upon a human characterization of the ad or an automatic characterization of the ad. The performance score may reflect a variety of factors, such as the price paid by the advertiser to display the ad, the price paid by the advertiser when the ad is clicked-through, the rate at which the ad has been clicked-through, the price the advertiser pays for conversions based upon the ad, the rate at which the ad has produced conversions, etc. In accordance with the example, the facility collects advertising messages 12894 and 17895 from the ad table, each of which lists the keyword "films."

Returning to FIG. 3, in FIG. 305, the facility weights each advertising message collected in step 304 based upon a performance score maintained for the collected advertising message.

FIG. 7 is a table diagram showing an ad selection table typically used by the facility to store a weighting value for each collected ad. The table 700 is made up of rows such as rows 701-702 each corresponding to an advertising message collected in step 304. Each row is divided into an ad column 711 identifying the ad and a weighting value column 712 containing a weighting value attributed by the facility to the ad. For example, row 701 indicates that ad 12894 has a weighting value of 0.756. The facility may attribute a weighting value that is equal to the performance score of each ad, as shown. Alternatively, the facility may adjust each ad's performance score to obtain its weighting value, such as normalizing the weighting values to a convenient value, such as 1. The facility may also adjust the weighting values to emphasize or de-emphasize differences between them. For example, by basing the weightings on an exponentiation of the scores to a power greater than 1, the facility tends to emphasize differences between the scores. On the other hand, by basing the weightings on an exponentiation of the scores to a power between 0 and 1, the facility tends to deemphasize differences between the scores.

Returning to FIG. 3, in step 306, the facility randomly selects one of the collected advertising messages in accordance with the weights attributed to them. In other words, in step 306, the facility makes a selection among the ads listed in the ad selection table such that the probability of each ad being selected is proportional to its weighting value. In such a selection, an ad having a higher weighting value has an advantage and is more likely to be selected than an ad having a lower weighting value, but the ad having a lower weighting value retains some opportunity to be selected. In step 307, the facility returns a version of the requested page that includes the advertising message selected in step 306. In step 308, the facility updates the performance score of the selected advertising message to reflect the requesting user's response to the selected advertising message. For example, if the performance scores are based on click-through rate and the user sees the advertising message without clicking on it, then the advertising message's performance score declines in response. On the other hand, if the user does click on the advertising message, then the advertising message's performance score improves. After step 308, the facility continues in step 301 to receive and process the next page request.

Those skilled in the art will appreciate that the steps shown in FIG. 3 may be altered in a variety of ways. For example, the order of the steps may be rearranged; substeps may be performed in parallel; shown steps may be omitted, or other steps may be included; etc.

FIGS. 8-10 show the updated contents of selected tables to reflect the sample user browsing to a second page of the publisher web site. FIG. 8 shows an updated browsing history table. The table 800 contains row 801 corresponding to row 401 of the browsing history table 400 shown in FIG. 4. It further contains a second row 802 reflecting this user's subsequent visit to the page http://www.xyz.com/sports/tennis ("the tennis page"). When the facility receives the user's page request for this page, it generates an updated keyword history table.

FIG. 9 is a table diagram showing an updated sample keyword history table. The table 900, in addition to row 901 corresponding to keyword history table 500 shown in FIG. 5, includes new rows 901-902 each identifying a keyword attributed to the tennis page in row 202 of page analysis table 200 shown in FIG. 2. Based upon the updated keyword history table, the facility generates an updated ad selection table.

FIG. 10 is a table diagram showing an updated sample ad selection table. The table 1000, in addition to including rows 1001 and 1002 corresponding to rows 701 and 702 contained in ad selection table 700 shown in FIG. 7, includes additional rows 1003-1005, each corresponding to an ad listed in ad table 600 shown in FIG. 6 listing at least one of the new keywords, "racket" and "athlete." The facility proceeds to select an ad from ad selection table 1000 for inclusion in the tennis page. It can be seen the ad row 1003 contains the highest weighting value, and that therefore ad 10623, which was not available when the user was visiting the movies page, has the highest likelihood of selection for inclusion on the tennis page.

In the example, the sample user goes on to visit the publisher's home page, "http://www.xyz.com." Because no keywords are attributed to the home page as shown in row 201 of the page analysis table shown in FIG. 2, the resulting keyword history table and ad selection table have the same contents during the request for the home page as they do during the request for the tennis page. Accordingly, the selection of an ad to include in the home page is performed on the same basis as the selection of the ad for presentation on the tennis page, differing only in terms of the outcome of the random selection.

FIGS. 11 and 12 illustrate an embodiment of the facility that, rather than tracking the performance of and selecting ads, instead tracks the performance of and selects keywords. FIG. 11 is a table diagram showing a sample keyword performance table typically used by the facility. The keyword performance table 1100 is analogous to the ad table 600 shown in FIG. 6 in that it contains a performance score for each of the keywords available for indirectly specifying an advertising message. For example, row 1102 indicates that the keyword "athlete" has a performance score of 0.206. Rather than collecting advertising messages and weighting them as shown in steps 304 and 305, the facility collects keywords identified in step 303 as corresponding to the pages recently visited by the user and attributes weighting values to the keywords.

FIG. 12 is a table diagram showing a sample keyword selection table typically used by the facility. The table 1200 is analogous to the ad selection table 1000 shown in FIG. 10, in that it contains a weighting value for each collected keyword. For example, row 1202 indicates that the keyword "athlete" has a weighting value of 0.206. In a manner similar to step 306, the facility randomly selects one of the collected keywords in a manner that reflects their respective weighting values. The selected keyword is then used to select a particular advertising message, such as by a separate ad-serving company.

Figures 13, 14:
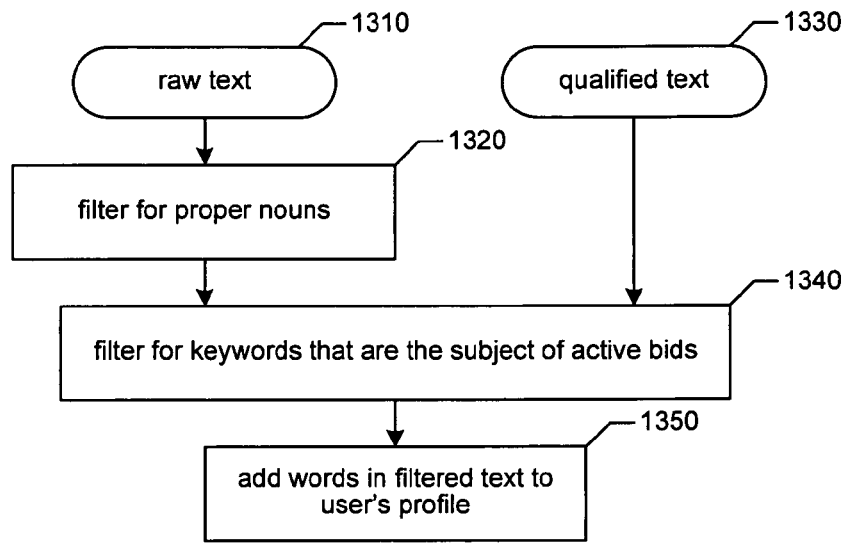
FIG. 13 is a data flow diagram showing a data flow used by some embodiments of the facility to process raw text and qualified text submitted for a user by a publisher.
FIG. 14 is a display diagram showing a typical display presented by a publisher website from which the publisher may collect and submit raw text for a user.

FIG. 13 is a data flow diagram showing a data flow used by some embodiments of the facility to process raw text and qualified text submitted for a user by a publisher. For raw text 1310 received from a publisher by the facility, the facility filters the raw text for keywords likely to be useful, such as proper nouns, in step 1320. In some embodiments, the facility performs such filtering by comparison to a list of proper nouns and/or keywords likely to be useful, such as a list compiled from selected sections of a directory of terminology such as the dmoz Open Directory Project directory, available at http://www.dmoz.orq. In step 1340, the facility subjects both the result of filtering step 1320 as well as text submitted by the publisher as qualified text to further filtering that extracts only keywords that are currently the subject of active advertising bids. In step 1350, the facility adds words outputted by filtering step 1340 to the user's profile.

FIG. 14 is a display diagram showing a typical display presented by a publisher web site from which the publisher may collect and submit raw text for a user. The display 1400 comprises a display for editing a personal page corresponding to a particular user. A user can use the display to edit the following information about him- or herself in fields such as the following: a name field 1410, a home town field 1420, a photo field 1430, and an interests field 1440. After the user has made a change to the contents of any of these fields, the user may select a submit button 1450 to submit the changed contents for inclusion on the user's personal page. In this example, when the user does so, the publisher submits the contents of the interests field 1440 as raw text to the facility, here "I like rollerblading, and am a big fan of the Chicago Blackhawks." In response, the facility filters the contents of interests field 1440 for both (a) proper nouns and/or other keywords likely to be successful, as well as (b) keywords that are the subject of active bids. As a result, the contents of the interests field may be filtered down to the keyword "Chicago Blackhawks" in the first filtering step, and pass through the second filtering step only if the keyword "Chicago Blackhawks" is currently the subject of an active advertising bid.

In addition to being usable to select advertising messages for inclusion in web pages, the facility may also be used to select advertisements for presentation in a wide variety of other environments. As one example, in some embodiments, the facility is used to select advertising messages to present with a media sequence, such as an audio sequence or a video sequence. In some instances, the facility may operate in connection with an audio and/or video player installed on a computer system or similar device, or in connection with a digital video recorder or similar home entertainment device. In these embodiments, the facility selects an advertising message to be presented in connection with a multimedia sequence based upon the identity of the multimedia sequence presently being presented to the user, the identity of multimedia sequences previously presented to the user, or both. Further details are discussed in U.S. patent application Ser. No. 10/830,866, filed on Apr. 23, 2004, which is hereby incorporated by reference in its entirety.

It will be appreciated by those skilled in the art that the above-described facility may be straightforwardly adapted or extended in various ways. For example, some or all of the functionality of the facility may be provided on the behalf of one or more publishers by one or more third-party service providers. Further, a variety of schemes may be used for scoring the performance of advertising messages and/or keywords, and for generating probability weightings based upon such scores. Also, the facility may be used in connection with a wide variety of information and/or entertainment display and advertising environments. While the foregoing description makes reference to particular embodiments, the scope of the invention is defined solely by the claims that follow and the elements recited therein.

We claim:

1. A method performed by a computing system having a processor and a memory for selecting an advertising message for inclusion in a requested web page, comprising:
   receiving a page request sent by a user identifying the requested page;
   adding the requested page to a page request history listing pages recently requested by the user;
   using a mapping from pages to keywords describing those pages to identify a set of keywords each mapped to from at least one of the pages listed in the page request history;
   using a mapping from keywords to advertising messages described by those keywords to identify a set of advertising messages each mapped to from at least one of the identified set of keywords;
   to each of the identified set of advertising messages, attributing a selection weighting reflecting the advertising message's relative performance, wherein the relative performance is determined by a performance score that indicates the extent to which the advertising message has generated revenue;
   selecting one advertising message of the identified set of advertising messages in accordance with the selection weightings attributed to the advertising messages of the identified set of advertising messages; and
   responding to the page request with a version of the requested page that includes an instruction to display the selected advertising message within the page, wherein code implementing the method is stored in the memory of the computing system for execution by the processor of the computing system.

2. A computer-readable storage medium whose contents cause a computing system to perform a method for designating an advertising message for inclusion in a requested page, the method comprising:
   receiving a page request sent by a user identifying the requested page;
   determining a set of subjects each relating to at least one of a set of pages recently visited by the user, the set of pages including the requested page by virtue of the page request for the requested page;
   from among the set of subjects, randomly selecting one subject in accordance with a selection weighting for each subject based upon a performance score attributed to the subject that reflects the performance of advertising messages selected using the subject, wherein the performance score indicates the extent to which the advertising messages selected using the subject have generated revenue; and
   responding to the page request with a version of the requested page that includes an instruction to select an advertising message for display within the page on the basis of the selected subject.

3. The computer-readable storage medium of claim 2, the method further comprising augmenting the set of subjects based upon information explicitly provided by a publisher of the requested page, wherein the provided information overtly identifies one or more subjects, each of which is included in the augmented set of subjects.

4. The computer-readable storage medium of claim 2, the method further comprising augmenting the set of subjects based upon information explicitly provided by a publisher of the requested page, wherein the provided information overtly identifies one or more subjects, of which only subjects that are currently the subject of an active advertising bid are included in the augmented set of subjects.

5. The computer-readable storage medium of claim 2, the method further comprising augmenting the set of subjects based upon information explicitly provided by a publisher of the requested page, wherein the provided information implicitly identifies one or more subjects, and wherein the method further comprises extracting subjects from the provided information, and wherein the augmenting adds the extracted subjects to the set of subjects.

6. The computer-readable storage medium of claim 5 wherein the provided information is received directly from the user sending the page request as an expression of the user's interests.

7. The computer-readable storage medium of claim 2, the method further comprising augmenting the set of subjects based upon information explicitly provided by a publisher of the requested page, wherein the provided information implicitly identifies one or more subjects, and wherein the method further comprises extracting subjects from the provided information, and wherein the augmenting adds to the set of subjects only extracted subjects that are currently the subject of an active advertising bid are included in the augmented set of subjects.

8. The computer-readable storage medium of claim 7 wherein the provided information is received directly from the user sending the page request as an expression of the user's interests, and wherein the provided information is received directly from the user sending the page request in response to an invitation to populate a personal page for the user sending the page request.

9. The computer-readable storage medium of claim 7 wherein the provided information is received directly from the user sending the page request as part of a query for searching a web site that includes the requested page.

10. A method performed by a computing system having a processor and a memory for designating an advertising message to present to a user via a selected device in connection with a selected instance of electronic content presented via the selected device, comprising:

for the selected instance of electronic content and any other instances of electronic content previously presented via the selected device during an immediately preceding period of time of preselected length, distinguishing any keywords identified as corresponding to the instance of electronic content;

weighting each of the distinguished keywords based upon the expected level of performance of advertising messages identified as corresponding to the distinguished keyword, wherein the expected level of performance indicates the extent to which advertising messages selected using the distinguished keyword have generated revenue; and randomly selecting one of the distinguished keywords in accordance with their weights for use in selecting an advertising message to present in connection with the selected instance of electronic content via the selected device, wherein code implementing the method is stored in the memory of the computing system for execution by the processor of the computing system.

11. The method of claim 10, further comprising using the selected keyword to select an advertising message to present in connection with the selected instance of electronic content via the selected device; and presenting the selected advertising message via the selected device.

12. The method of claim 10 wherein at least one of the instances of electronic content is textual content.

13. The method of claim 10 wherein at least one of the instances of electronic content is a web page.

14. The method of claim 10 wherein at least one of the instances of electronic content is an audio sequence.

15. The method of claim 10 wherein at least one of the instances of electronic content is a song.

16. The method of claim 10 wherein at least one of the instances of electronic content is an album.

17. The method of claim 10 wherein at least one of the instances of electronic content is a radio program.

18. The method of claim 10 wherein at least one of the instances of electronic content is a video sequence.

19. The method of claim 10 wherein at least one of the instances of electronic content is a movie.

20. The method of claim 10 wherein at least one of the instances of electronic content is a television program.

* * * * *